United States Patent
Mori et al.

[11] Patent Number: 5,918,366
[45] Date of Patent: Jul. 6, 1999

[54] METHOD OF FORMING A TAPPET IN AN INTERNAL COMBUSTION ENGINE

[75] Inventors: Akiyoshi Mori, Yokohama; Satoshi Fukuoka, Atsugi; Tatsuo Kanzaki, Fujisawa, all of Japan

[73] Assignee: Funi Oozx Inc., Japan

[21] Appl. No.: 08/919,488

[22] Filed: Aug. 28, 1997

[30] Foreign Application Priority Data

Sep. 5, 1996 [JP] Japan .................................. 8-234818

[51] Int. Cl.⁶ .................................................. B23P 15/00
[52] U.S. Cl. .................................... 29/888.43; 29/888.42
[58] Field of Search ............................. 29/888.43, 888.4, 29/888.42, 527.4; 123/193.6

[56] References Cited

U.S. PATENT DOCUMENTS

| | | | |
|---|---|---|---|
| 2,467,079 | 4/1949 | Corlett | 29/888.43 |
| 3,058,454 | 10/1962 | Goncalves | 123/90 |
| 3,279,446 | 10/1966 | Rappa | 123/90 |
| 4,909,198 | 3/1990 | Shiraya et al. | 123/90.51 |
| 5,228,418 | 7/1993 | Doehring | 123/90.51 |
| 5,280,771 | 1/1994 | Groh et al. | 123/90.51 |
| 5,729,900 | 3/1998 | Hara et al. | 29/888.43 |
| 5,743,224 | 4/1998 | Hosaka et al. | 29/888.43 |
| 5,758,415 | 6/1998 | Hara | 29/888.43 |

*Primary Examiner*—I Cuda
*Attorney, Agent, or Firm*—Oppenheimer Wolff & Donnelly LLP

[57] ABSTRACT

An Al alloy tappet used in an internal combustion engine has a spiral groove on the outer circumferential surface of a tappet body. The spiral groove is formed by pushing a cutting tool against the outer circumferential surface and feeding it in an axial direction. Near the lower end of the tappet body, feed rate is decreased, and the cutting tool is moved away from the tappet body to form a smaller spiral groove which increases in diameter downwards. The outer circumferential surface of the tappet body is covered with a coating layer such as Fe, and the lower end which has the smaller spiral groove is chamfered.

8 Claims, 5 Drawing Sheets

METHOD OF FORMING A TAPPET IN AN INTERNAL COMBUSTION ENGINE

BACKGROUND OF THE INVENTION

The present invention relates to a method of forming a tappet in an internal combustion engine, the outer circumferential surface of a tappet body being covered with a coating layer.

Tappets used in a direct acting type valve operating mechanism of an internal combustion engine are made of Al alloy to lighten it. Al alloy tappets are poorer than Fe alloy tappets in mechanical strength and wear resistance. Therefore, coating layer made of hard material is formed on the outer circumferential surface by thermal spraying which can be relatively easily carried out.

To form the coating layer by thermal spraying, it is necessary to increase adhesion strength of spraying material and peel resistance by making the outer circumferential surface of the tappet rough in a prior step. However, rough surface treatment such as blasting needs a long time which causes low productivity, and a lot of blasting materials are required, thereby increasing manufacturing cost.

To solve the problem, as shown in FIG. 9, a method of forming a tappet is suggested in which a rough surface which comprises a spiral groove 2 is formed on the outer circumferential surface of a tappet body 1 by a cutting tool, hard material being thermally sprayed onto the surface to form a coating layer.

However, as mentioned above, in the method wherein the coating layer 3 is formed on the spiral groove 2, when the outer circumferential surface is finished after thermal spraying, a chamfered portion 4 is formed at the lower end, so that a crest of the spiral groove 2 is exposed on the coating layer 3, which decreases in thickness at the lower end and is discontinuous, thereby decreasing adhesion strength of the coating layer 3, which is liable to peel off. If small hard peeled pieces come into an interface between a cylinder head and the tappet during operation of the engine, sliding surfaces significantly wears.

SUMMARY OF THE INVENTION

In view of the disadvantage, it is an object of the present invention to provide a method of forming a tappet to prevent a spiral groove from exposing on a coating layer when the end of a tappet body is chamfered, to increase peel resistance significantly, the method being carried out at low cost.

According to one aspect of the present invention, there is provided a method of forming a tappet in an internal combustion engine, the method comprising the steps of pushing a cutting tool against the outer circumferential surface of a tappet body to apply feed in an axial direction to form a spiral groove which has the same diameter and the same pitch; moving the cutting tool away from the tappet body with decrease in feed rate of the cutting tool when the spiral groove reaches near a lower end of the tappet body, to form a smaller spiral groove near the lower end of the tappet body, said smaller spiral groove gradually increasing in diameter towards the lower end of the tappet body; and covering the outer circumferential surface of the tappet body with a coating layer which comprises hard material.

According to another aspect of the present invention, there is provided a method of forming a tappet in an internal combustion engine, the method comprising the steps of pushing a cutting tool against the outer circumferential surface of a tappet body to apply feed in an axial direction to form a spiral groove which has the same diameter and the same pitch; moving the cutting tool away from the tappet body once when the spiral groove reaches near a lower end of the tappet body; decreasing feed rate of the cutting tool to push the cutting tool against the outer circumferential surface of the tappet body again to cut towards an axis of the tappet body gradually to form a smaller spiral groove at the lower end of the tappet body, said smaller spiral groove gradually decreasing towards a lower end of the tappet body in diameter; and covering the outer circumferential surface of the tappet body with a coating layer which comprises hard material.

According to the present invention, the smaller spiral groove in the outer circumferential surface at least of the lower end of the tappet body is covered with the coating layer. Even when the lower end is chamfered, without exposure of crests of the smaller spiral groove, there is little possibility that the coating layer is peeled off. Furthermore, the surface area of the smaller spiral groove increases, thereby increasing adhesion strength of the coating layer and peel resistance. Rough surface treatment to the tappet body can be easily carried out by the cutting tool without blasting as in the prior art, thereby decreasing cost.

BRIEF DESCRIPTION OF THE DRAWINGS

The features and advantages of the invention will become more apparent from the following description with respect to embodiments which are shown in appended drawings wherein.

DETAILED DESCRIPTION OF PREFERRED EMBODIMENTS

FIGS. 1 to 5 illustrate the first embodiment of the present invention. While a tappet body 1 made of an Al alloy is rotated on an axis, a cutting tool (not shown) is pushed against the outer circumferential surface of the tappet body and feed is applied in an axial direction to form a spiral groove 2 which has the same diameter and pitch.

Figure 1:
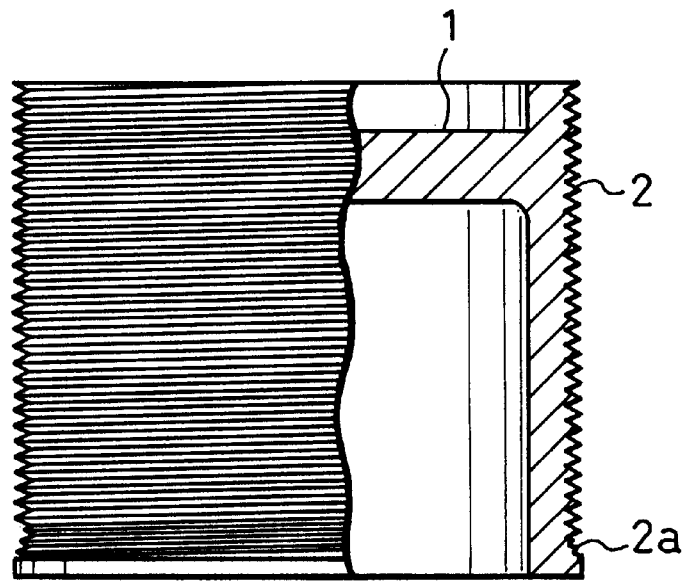
FIG. 1 is a partially sectioned front view which shows a spiral groove on the outer circumferential surface of a tappet body in the first embodiment.
Figure 2:
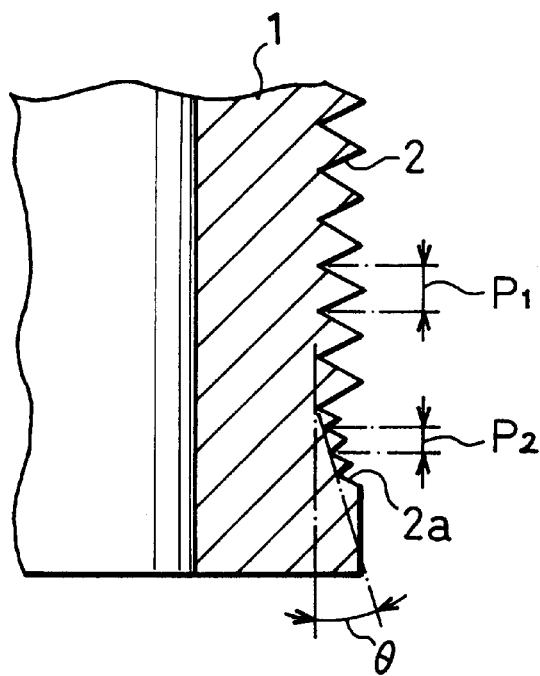
FIG. 2 is an enlarged view of a main portion of FIG. 1.

However, feed is applied in an axial direction at fixed speed to the lower end of the tappet body 1 or to the area where a chamfered portion is formed at the following step as mentioned below. Thereafter, with decrease in feed rate, the cutting tool is gradually moved away from the tappet body 1 to form a smaller spiral groove 2a which gradually increases in diameter from the end of the groove to the lower end of the tappet body 1. As shown in FIG. 2, pitches $P_1$ and $P_2$ of the spiral groove 2 and the smaller spiral groove 2a are, for example, 0.277 mm and 0.115 mm respectively, and an angle "θ" of the smaller spiral groove to the axis is set to about 30°.

Figure 3:
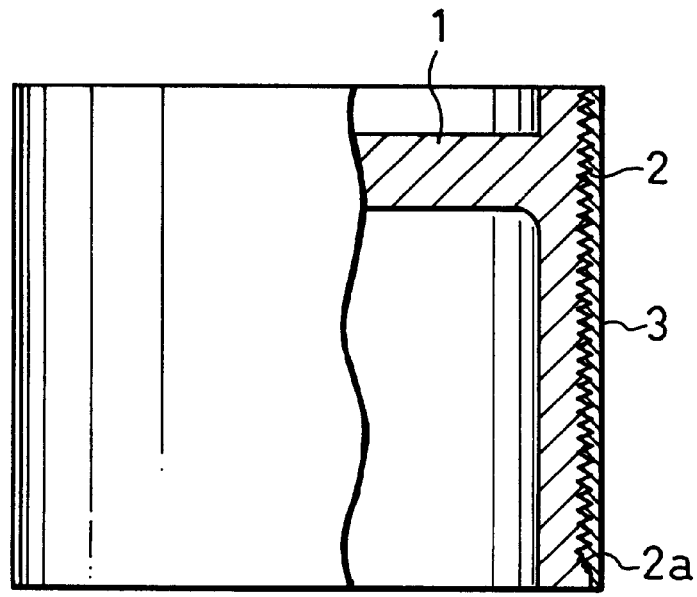
FIG. 3 is a partially sectioned front view which shows a coating layer on the outer circumferential surface of the tappet body.
Figure 4:
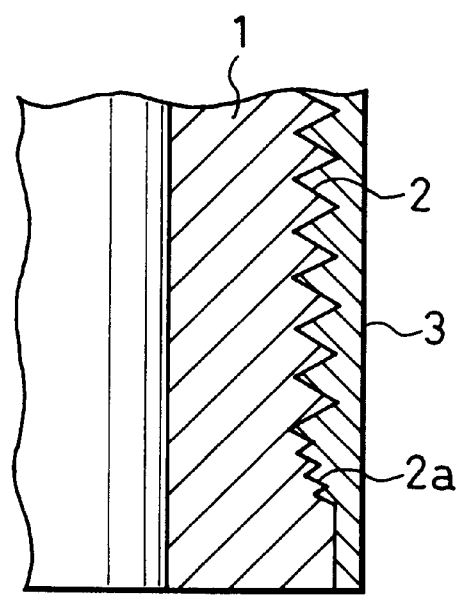
FIG. 4 is an enlarged view of a main portion of FIG. 3.

After the spiral grooves 2 and 2a are formed, hard Fe material is thermally sprayed onto the outer circumferential surface of the tappet body 1 to form a coating layer 3 having a desired thickness such as 0.3 mm, as shown in enlarged FIGS. 3 and 4.

Figure 5:
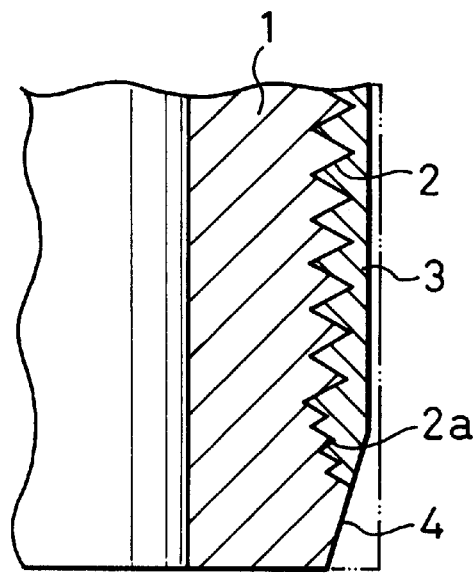
FIG. 5 is an enlarged view thereof after chamfering.

Further, as shown in FIG. 5, finishing is applied to the outer circumferential surface of the coating layer 3 to make the external diameter to a fixed size and to chamfer the smaller spiral groove to the lower end of the tappet body 1 to form a chamfered portion 4. The angle of the chamfered portion 4 is set to 10 to 15°. The chamfered portion 4 is formed by cutting a corner from the middle of the smaller spiral portion 2a at the lower end of the tappet body 1.

In the tappet manufactured in the foregoing embodiment, the chamfered portion 4 of the tappet body 1 contains the smaller spiral groove 2a which gradually increases in diameter. A crest of the smaller spiral groove 2a is not exposed on the coating layer 3 even when chamfered. Further, the area of the outer circumferential surface increases, so that adhesion strength of spraying material increases, thereby increasing peel resistance of the coating layer significantly. At the lower end of the chamfered portion 4, the tappet body 1 is exposed, but the exposed portion is not engaged with a bore of the cylinder head. So it is not necessary to consider wear resistance.

Figure 6:
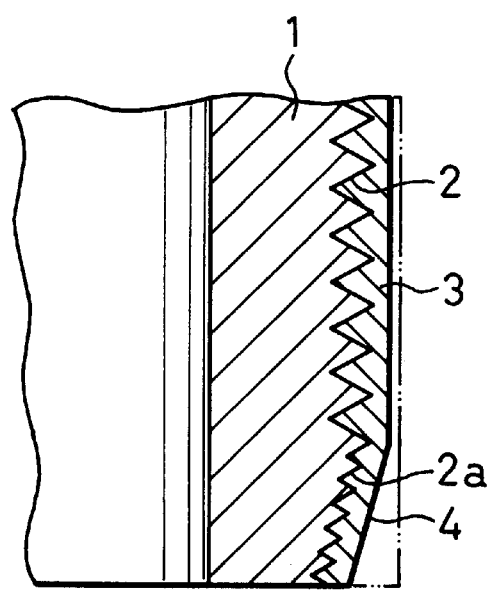
FIG. 6 is an enlarged view of a main portion of a tappet obtained in the second embodiment.

FIG. 6 shows a main portion of the second embodiment of a tappet according to the present invention, in which a spiral groove 2 which has the same pitch and the same external diameter as those in the first embodiment is formed. Thereafter, the edge of the cutting tool is moved towards the outer circumferential surface of the tappet body 1 near the lower end of the tappet body 1, and gradually cut towards the axis of the tappet body 1 again to form a smaller spiral groove 2a which tapers towards the lower end.

Then, a coating layer 3 similar to that in the first embodiment is formed by thermal spraying, and at the same time with finishing of the outer circumferential surface, a chamfered portion 4 is formed on the outer circumferential surface of the area where the smaller spiral groove 2a is formed. The angle of the smaller spiral groove 2a to the axis is equal to or larger than the angle of the chamfered portion 4, such as 10 to 60°. In the second embodiment, spraying material of the smaller spiral groove 2a increases in adhesion strength, thereby increasing peel resistance of the coating layer 3. The coating layer 3 of the smaller spiral groove 2a can be increased in thickness which is equal to the amount to be tapered. Thus, even if the coating layer 3 is cut during chamfering, a crest of the smaller spiral groove 2a is not exposed, thereby preventing the coating layer 3 from peeling off.

Figure 7:
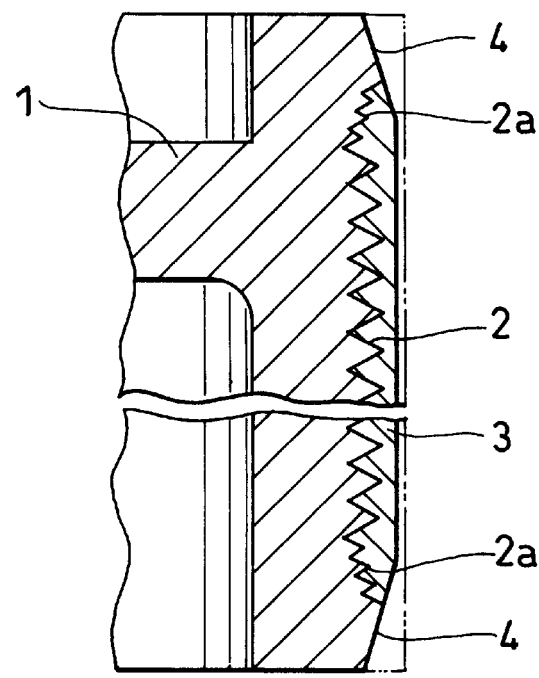
FIG. 7 is an enlarged view of a main portion of a tappet obtained in another embodiment.
Figure 8:
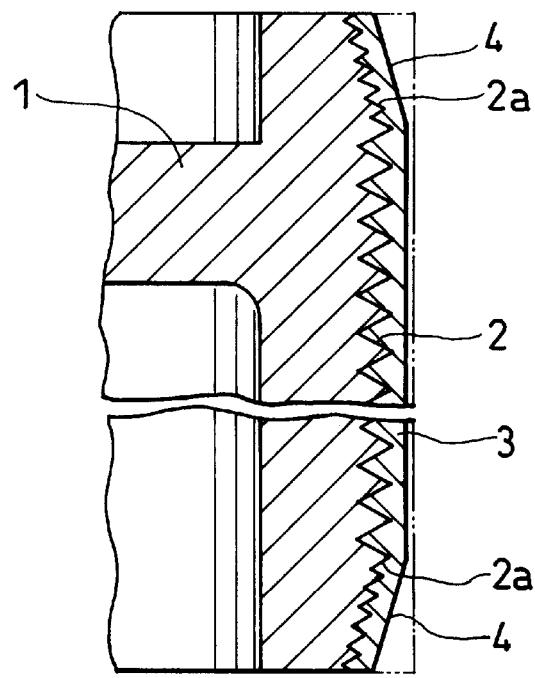
FIG. 8 is an enlarged view of a main portion of a tappet obtained in further embodiment.
Figure 9:
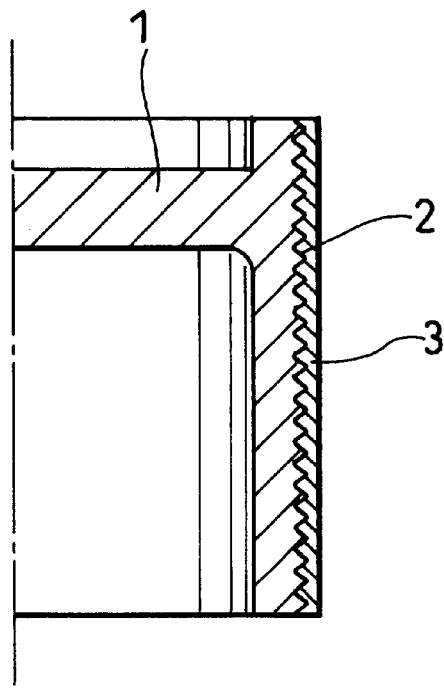
FIG. 9 is a vertical sectioned front view of a conventional tappet in which a coating layer is formed on a spiral groove on the outer circumferential surface.
Figure 10:
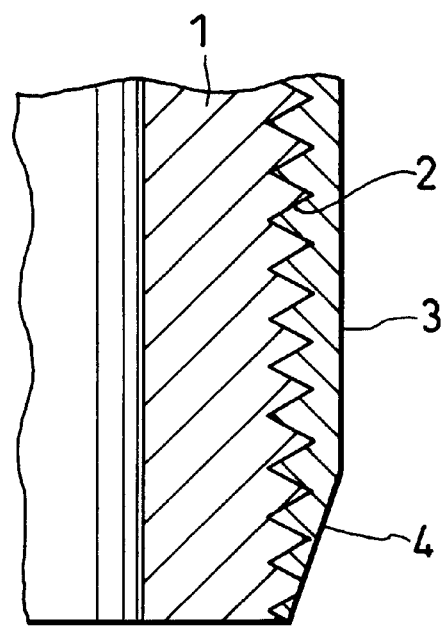
FIG. 10 is an enlarged vertical sectional view which shows a chamfered portion at the lower end of the tappet in FIG. 9.

The present invention is not limited to the foregoing embodiments in which the smaller spiral groove 2a is formed at the lower end of the tappet body 2a. But a smaller sprial groove 2c may be also formed at the upper end of the tappet body 1 as shown in FIGS. 7 and 8. Thus, similar to the above, the chamfered portion 4 is formed at the upper end of the tappet body 1 after the coating layer 6 is formed, thereby increasing peel resistance of the coating layer 3. In addition to Al alloy tappet, the present invention may be applied to Ti alloy tappet. The coating layer 3 may be formed by plating instead of thermal spraying.

Various changes and modifications may be made by person skilled in the art without departing from the scope of claims wherein:

What is claimed is:

1. A method of forming a tappet in an internal combustion engine, the method comprising the steps of:

pushing a cutting tool against an outer circumferential surface of a tappet body to apply feed in an axial direction to form a spiral groove which has the same diameter and the same pitch;

moving the cutting tool away from the tappet body with decrease in feed rate of the cutting tool when the spiral groove reaches near a lower end of the tappet body, to form a smaller spiral groove near the lower end of the tappet body, said smaller spiral groove gradually increasing in diameter towards the lower end of the tappet body; and covering the outer circumferential surface of the tappet body with a coating layer which comprises hard material.

2. The method as defined in claim 1 wherein another smaller spiral groove is formed at an upper end of the tappet body in a manner similar to the step for forming the smaller spiral groove at the lower end of the tappet body.

3. The method as defined in claim 1 wherein the tappet is made of Al alloy.

4. The method as defined in claim 1 wherein the hard material comprises Fe.

5. Method of forming a tappet in an internal combustion engine, the method comprising the steps of:

pushing a cutting tool against an outer circumferential surface of a tappet body to apply feed in an axial direction to form a spiral groove which has the same diameter and the same pitch;

moving the cutting tool away from the tappet body once when the spiral groove reaches near a lower end of the tappet body;

decreasing feed rate of the cutting tool to push the cutting tool against the outer circumferential surface of the tappet body again to cut towards an axis of the tappet body gradually to form a smaller spiral groove at the lower end of the tappet body, said smaller spiral groove gradually decreasing towards the lower end of the tappet body in diameter; and covering the outer circumferential surface of the tappet body with a coating layer which comprises hard material.

6. The method as defined in claim 5 wherein another smaller spiral groove is formed at an upper end of the tappet body in a manner similar to the steps for forming the smaller spiral groove at the lower end of the tappet body.

7. The method as defined in claim 5 wherein the tappet is made of Al alloy.

8. The method as defined in claim 5 wherein the hard material comprises Fe.

* * * * *